(12) United States Patent
Ikeda et al.

(10) Patent No.: US 7,834,842 B2
(45) Date of Patent: Nov. 16, 2010

(54) PARTICLE MOVEMENT-TYPE DISPLAY APPARATUS

(75) Inventors: Tsutomu Ikeda, Hachiohji (JP); Takehiko Soda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 10/581,481

(22) PCT Filed: Jun. 3, 2005

(86) PCT No.: PCT/JP2005/010630

§ 371 (c)(1), (2), (4) Date: Apr. 6, 2007

(87) PCT Pub. No.: WO2005/119354

PCT Pub. Date: Dec. 15, 2005

(65) Prior Publication Data

US 2008/0036730 A1     Feb. 14, 2008

(30) Foreign Application Priority Data

Jun. 4, 2004  (JP)  ............................ 2004-167723
May 20, 2005  (JP)  ............................ 2005-147530

(51) Int. Cl.
G09G 3/34     (2006.01)
(52) U.S. Cl. ...................................... 345/107; 359/296

(58) Field of Classification Search ................. 345/107; 359/296; 313/498
See application file for complete search history.

(56) References Cited

U.S. PATENT DOCUMENTS

| 6,392,786 | B1 | 5/2002 | Albert | |
|---|---|---|---|---|
| 2003/0048521 | A1* | 3/2003 | Ikeda et al. | ................... 359/296 |
| 2003/0231162 | A1* | 12/2003 | Kishi | ............................ 345/107 |
| 2005/0190431 | A1* | 9/2005 | Matsuda | ...................... 359/296 |

FOREIGN PATENT DOCUMENTS

| JP | 1-221788 | 9/1989 |
|---|---|---|
| JP | 1-300230 | 12/1989 |
| JP | 2003-344880 | 12/2003 |

OTHER PUBLICATIONS

International Search Report dated Sep. 23, 2005.

* cited by examiner

*Primary Examiner*—Quan-Zhen Wang
*Assistant Examiner*—Yuk Chow
(74) *Attorney, Agent, or Firm*—Fitzpatrick, Cella, Harper & Scinto

(57) ABSTRACT

A particle movement-type display apparatus is constituted by a pixel portion, a peripheral area around the pixel portion, and particles. At least a part of the peripheral area around the pixel portion is provided with a recess portion capable of accommodating a part of the particles therein.

5 Claims, 6 Drawing Sheets

PARTICLE MOVEMENT-TYPE DISPLAY APPARATUS

TECHNICAL FIELD

The present invention relates to a particle movement-type display apparatus, such as an electrophoretic display apparatus, for effecting display by utilizing movement of particles.

BACKGROUND ART

In recent years, study on reflection-type display apparatuses using no backlight has been actively made. Of these display apparatuses, a particle movement-type display apparatus attracts a lot of attention. The particle movement-type display apparatus includes, e.g., a pair of substrates with a predetermined spacing therebetween, a plurality of particles disposed in the spacing, and a pair of electrodes disposed internally in contact with the spacing. The particle movement-type display apparatus has various advantages, such as a high display contrast, a wide viewing angle, a display memory characteristic, unnecessity of a backlight and a polarization plate, etc., compared with a liquid crystal apparatus.

Generally, the particle movement-type display apparatus effects display by applying an electric field or the like to each pixel, between the pair of substrates, at which a certain amount of particles are disposed, thereby to move the particles within each pixel. For this purpose, ordinarily, a plurality of particles are disposed between two substrates on which a pixel electrode formed at each pixel and a common electrode for all the pixels are formed. The particles have a particle size of approximately 0.5-5 μm. In order to prevent movement of the particles between adjacent pixels to cause nonuniform distribution, a partition wall is formed at each pixel.

In the case of such a particle movement-type display apparatus having a partition wall structure, particles are generally filled between partition wall portions after all the members such as the electrodes and the partition wall are formed on one of the substrates, and then the particles are sealed in each pixel by the other substrate (sealing step), as described in Japanese Laid-Open Patent Application No. Tokkai Hei 05-307197 and Japanese Patent No. 2612472.

However, in the sealing step, the particles enter between the other substrate and the partition wall or a peripheral area of a display portion in some cases.

In such cases, a gap corresponding to a diameter of the particles is formed between the other substrate and the partition wall or the peripheral area, so that sealing of the display portion cannot be performed completely. As a result, there is a possibility that the particles are moved to other pixels or outside the display portion.

DISCLOSURE OF THE INVENTION

A principal object of the present invention is to provide a particle movement-type display apparatus having solved the above described problem.

A specific object of the present invention is to provide a particle movement-type display apparatus capable of reducing a gap, formed by particle(s), to a level smaller than a diameter (particle size) of the particle(s) even when a part of particles are sandwiched between a peripheral area of a display apparatus or a partition wall and an opposite substrate.

According to an aspect of the present invention, there is provided a particle movement-type display apparatus, comprising:

a pixel portion,
a peripheral area around the pixel portion, and
particles,
wherein at least a part of the peripheral area around the pixel portion is provided with a recess portion capable of accommodating a part of the particles therein.

According to another aspect of the present invention, there is provided a particle movement-type display apparatus, comprising:

a first substrate and a second substrate,
a partition wall disposed between the first and second substrates,
particles disposed at a pixel portion defined by the first substrate, the second substrate and the partition wall, and
an electrode for moving the particles,
wherein the apparatus further comprises a structure, which has a projection portion having a height substantially equal to a height of the partition wall and a recess portion in which a part of the particles are capable of being accommodated, disposed at at least a part of a peripheral area around a display portion comprising the plurality of pixel portions.

In a process for producing the particle movement-type display apparatus of the present invention, when each pixel (portion) is sealed by disposing the second substrate so as to cover the partition wall and the structure, the sealing is performed while applying an AC voltage between electrode layers formed at least at a part of the structure and its peripheral portion. In this case, it is also possible to cover the partition wall member and the structure with the second substrate to seal each pixel (portion) while also applying the AC voltage between a plurality of electrodes, disposed in contact with the spacing, comprising a pixel electrode disposed at each pixel and a common electrode.

According to the particle movement-type display apparatus of the present invention, it is possible to narrow the gap formed by particles compared with a diameter of the particles even in the case where the particles enter and are sandwiched between the peripheral area of the display portion or the partition wall and the opposite substrate.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Figure 1:
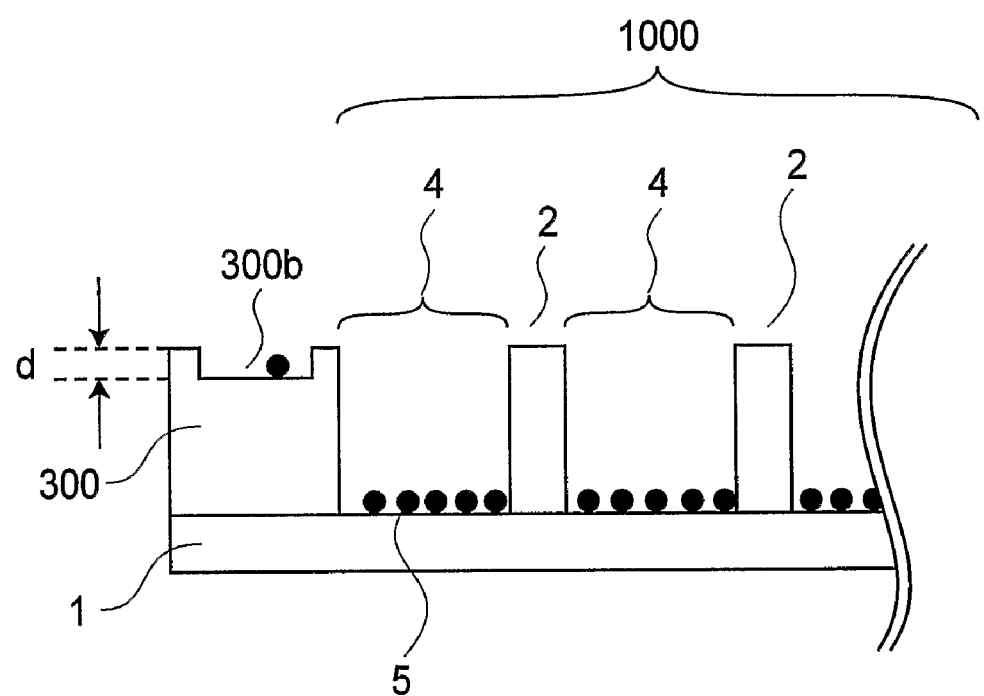
FIGS. 1(a) and 1(b) are schematic sectional views for illustrating a particle movement-type display apparatus according to the present invention.
Figure 1:
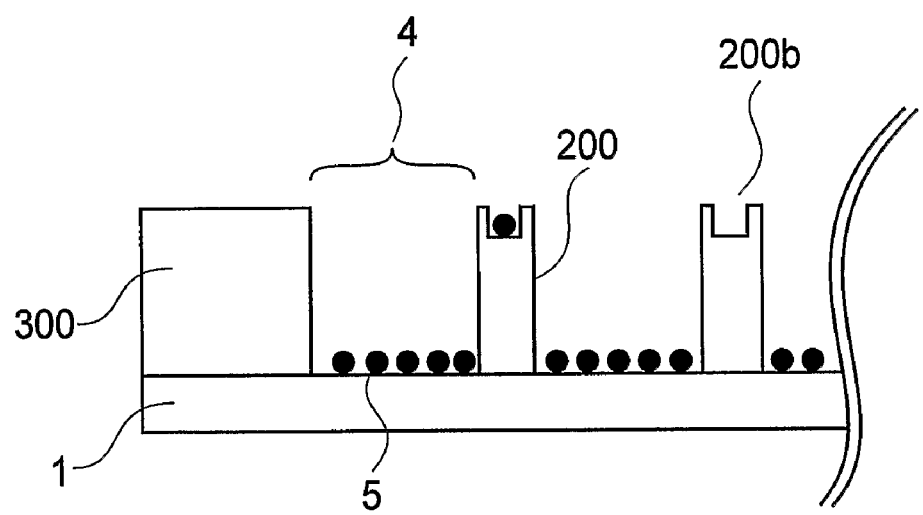

Hereinbelow, embodiments of the present invention will be described with reference to FIGS. 1 to 7.

FIGS. 1(a) and 1(b) show an embodiment of the particle movement-type display apparatus of the present invention.

Referring to these figures, the particle movement-type display apparatus includes a first substrate 1, a partition wall 2 for partitioning adjacent pixels (pixel portions), a plurality of pixels (pixel portions) 4, a display portion 1000 constituted by the plurality of pixels 4 and the partition wall 2, and peripheral areas 300 and 200 with respect to the pixel portions 4.

In the peripheral areas, recess portions 200b and 300b are formed.

The recess portion is formed at at least a part of the peripheral area and is capable of accommodating therein a particle 5. The recess portion may be formed in all the peripheral areas or a part of the peripheral areas.

Herein, the peripheral area means the peripheral area 300 of the display portion 1000 constituted by the plurality of pixels 4 (FIG. 1(a)) or the peripheral area 200 which is a partition wall disposed between adjacent pixels 4 (FIG. 1(b)).

As described above, when the recess portion is formed at least a part of the peripheral area, it is possible to reduce a gap at the recess portion to a level which is smaller than a diameter of particle even in the case where the particles enter the recess portion to form the gap. A depth d of the recess portion is not particularly limited but may preferably be not less than an average diameter (particle size) of the particles, more preferably be not less than 3 times the average diameter of the particles. Incidentally, an upper limit of the depth of the recess portion is a height of the partition wall.

The recess portion may be provided either one or both of the peripheral area 300 of the display portion 1000 and the partition wall (peripheral area) 200. Incidentally, in FIGS. 1(a) and 1(b), a second substrate disposed opposite to the first substrate 1 is omitted.

FIGS. 2(a) and 2(b) are a plan view (FIG. 2(a)) and a sectional view (FIG. 2(b)) of an embodiment of a representative particle movement-type display apparatus according to the present invention.

Referring to these figures, the particle movement-type display apparatus includes a first substrate 1 and a second substrate 2; a partition wall member 2 disposed between the first and second substrates; particles 5 disposed at a pixel portions 4 defined by the first substrate 1, the second substrate 2 and the partition wall member 2, and electrodes 7 and 9 for moving the particles 5. The apparatus further includes a structure 3, which has a projection portion 3a having a height substantially equal to a height of the partition wall and a recess portion 3b in which a part of the particles are capable of being accommodated, disposed at at least a part of a peripheral area (structure 3) comprising the plurality of pixel portions.

In this embodiment of the particle movement-type display apparatus, as shown in FIG. 2(a), mesh-shaped partition wall 2 and structure 3 are formed on the first substrate 1. In FIG. 2(a), only 4 pixels (pixel portions) 4 are indicated but a multiplicity of pixels are ordinarily formed in a matrix form in an actual display apparatus. Each pixel 4 is surrounded by the partition wall 2 so as to separate it from adjacent pixels, and at the periphery of the display portion constituted by the plurality of the display portion constituted by the plurality of pixels 4, the mesh-shaped structure 3 is disposed adjacent to the pixels.

As shown in FIG. 2(b) which is a sectional view along A-A' line of FIG. 2(a), in each pixel 4, an insulating liquid 11 and a plurality of electrophoretic particles 5 dispersed in the insulating liquid 11 are disposed. Upper surfaces of the mesh-shaped partition wall 2 and structure 3 are closely covered with the second substrate 12, and the second substrate 12 is bonded and fixed to the first substrate 1 with an adhesive at a peripheral frame portion to seal each pixel 4. In FIG. 2(b), a state of bonding and fixing with the adhesive is not shown, and FIG. 2(a), the second substrate 12 is not shown. In order to improve airtightness and strength of the display portion, a mesh density of the structure 3 on which a larger force is exerted is larger than a mesh density of the partition wall 2.

The structure 3 has the recess portion 3b, capable of accommodating the particles 5, and the projection portion 3a which is formed to have a height substantially equal to a height of the partition wall 2 generally formed at the display portion or is formed so that the height of the projection portion 3a is moderately decreased from a portion adjacent to the display portion toward an outer portion. This is because an adhesive property between the second substrate 12 and an upper surface of the projection portion 3a of the structure 3 is improved to ensure airtightness. A line width at the upper surface of the projection portion 3a of the structure 3 may preferably be not more than approximately 10 times, more preferably not more than approximately 5 times, the diameter of the electrophoretic particles 5 so that the electrophoretic particles 5 are less liable to stop on the upper surface of the projection portion 3a in a production step of the display apparatus. This is also true for a line width at the upper surface of the mesh-shaped partition wall 2. The line width at the upper surface of the projection portion 3a may appropriately determined while taking both of a required strength of the structure 3 and a degree of difficulty in stopping the electrophoretic particles 5 on the upper surface of the projection portion 3a into consideration.

Further, in the structure 3 forming area, a density of the projection portion 3a of the structure 3 is not particularly limited but may preferably be not more than approximately 50% in order that the electrophoretic particles 5 are less liable to stop on the upper surface of the projection portion 3a. However, in view of the strength of the structure 3, the density is required to be not less than approximately 5%. Further, a mesh density of the projection portion 3a of the structure 3 may be increased toward outside of the structure 3. This is because an airtightness-improving effect by the sealing is achieved.

In the case where the line width of the projection portion 3a of the structure 3 at the upper surface is relatively large, e.g., approximately 10 times the diameter of the electrophoretic particles 5, at the time of sealing the display portion by the second substrate 12, it is preferable that an AC voltage is applied so as to drop the particles 4 from the upper surface of the projection portion 3a with reliability, as described later. When the line width is relatively small, it is not necessary to apply the AC voltage at the time of the sealing by the second substrate 12 in some cases.

Figure 2:
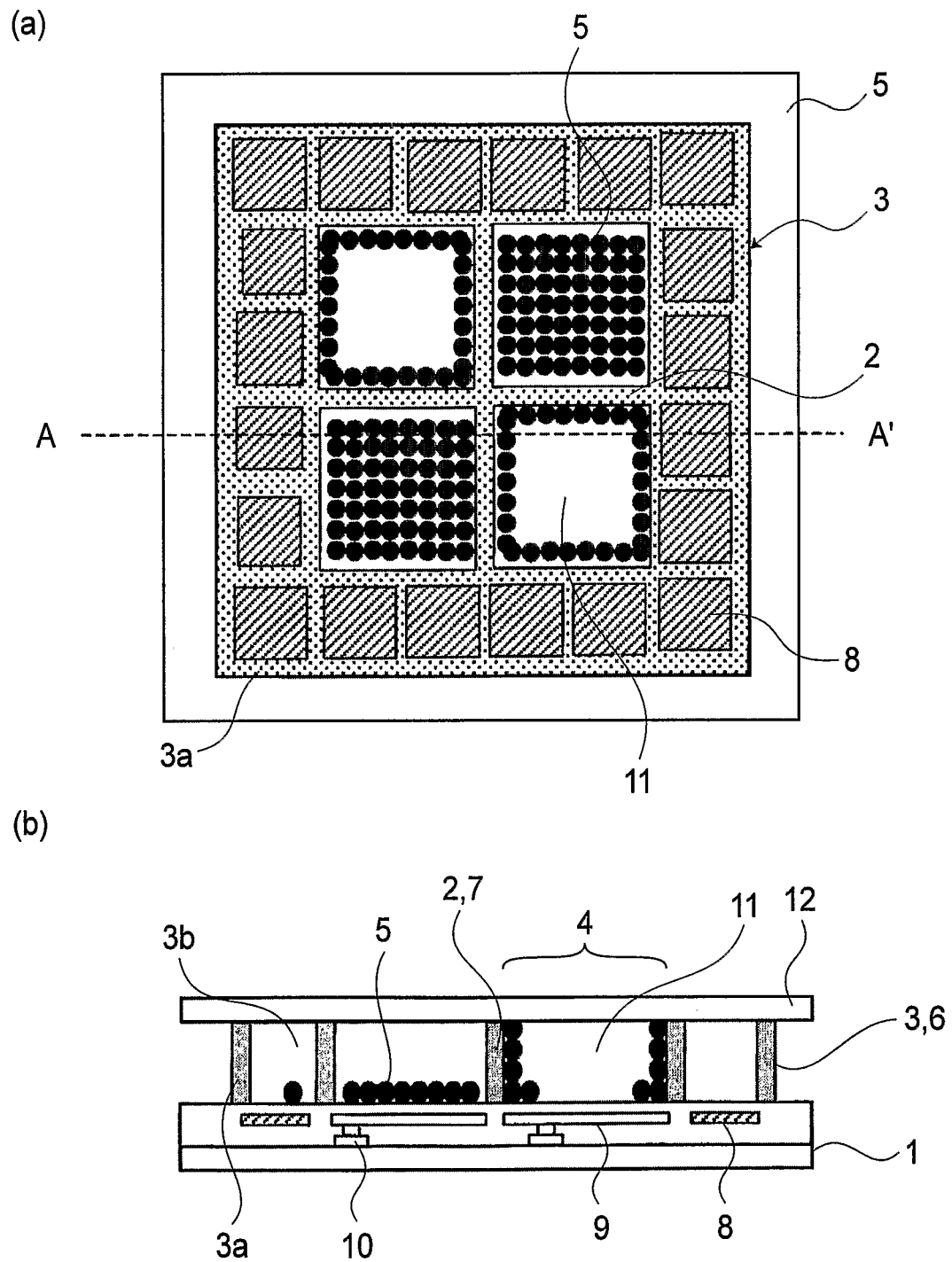
FIGS. 2(a) and 2(b) are a plan view and a sectional view, respectively, for illustrating an embodiment of the particle movement-type display apparatus of the present invention.
Figure 3:
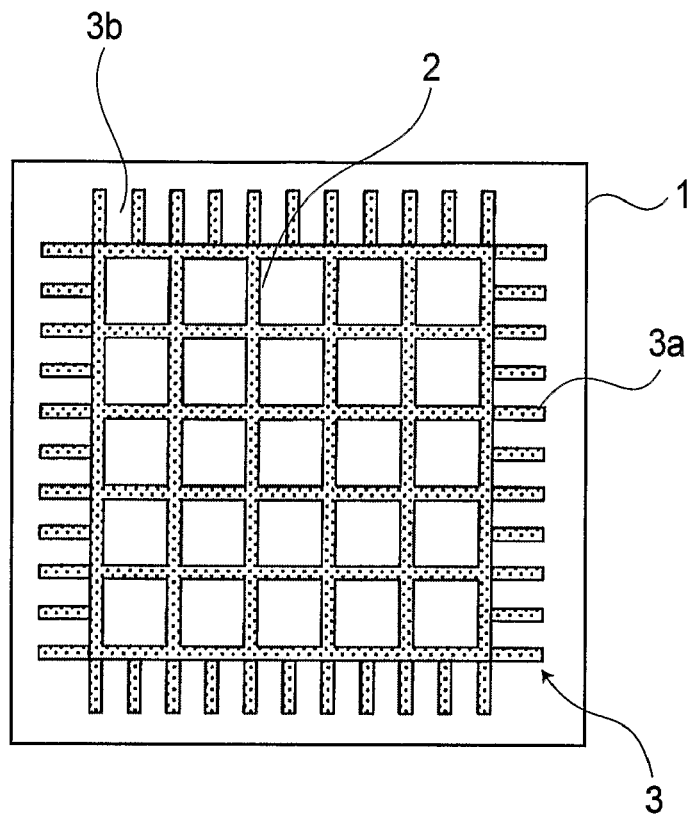
FIGS. 3, 4, 5 and 7 are plan views each for illustrating another embodiment of the particle movement-type display apparatus of the present invention.
Figure 4:
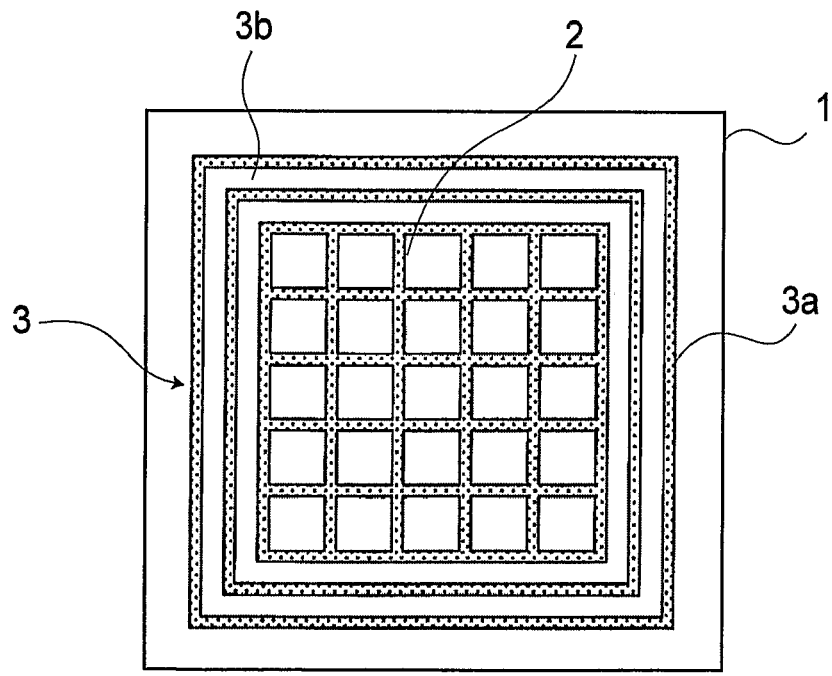
Figure 5:
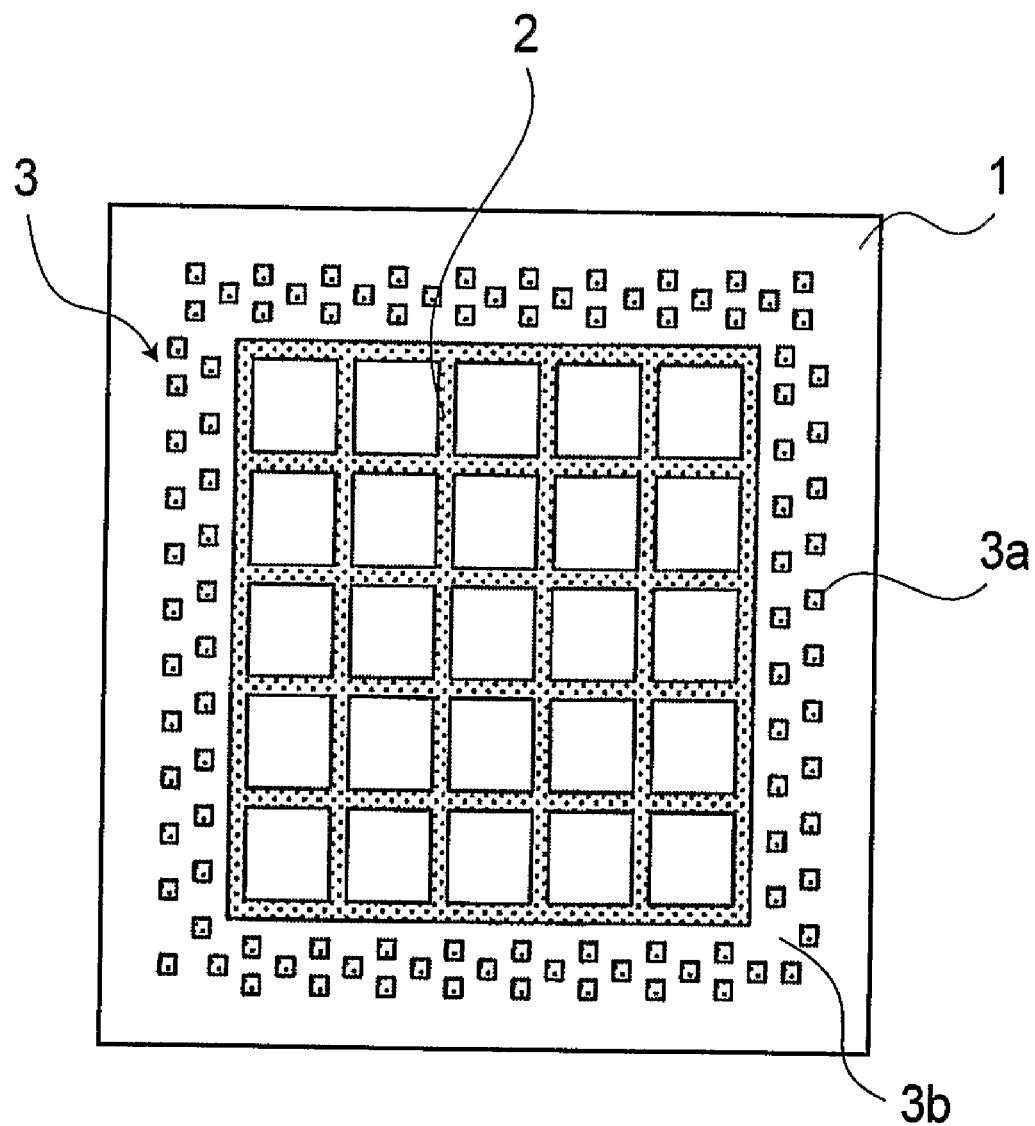
Figure 6:
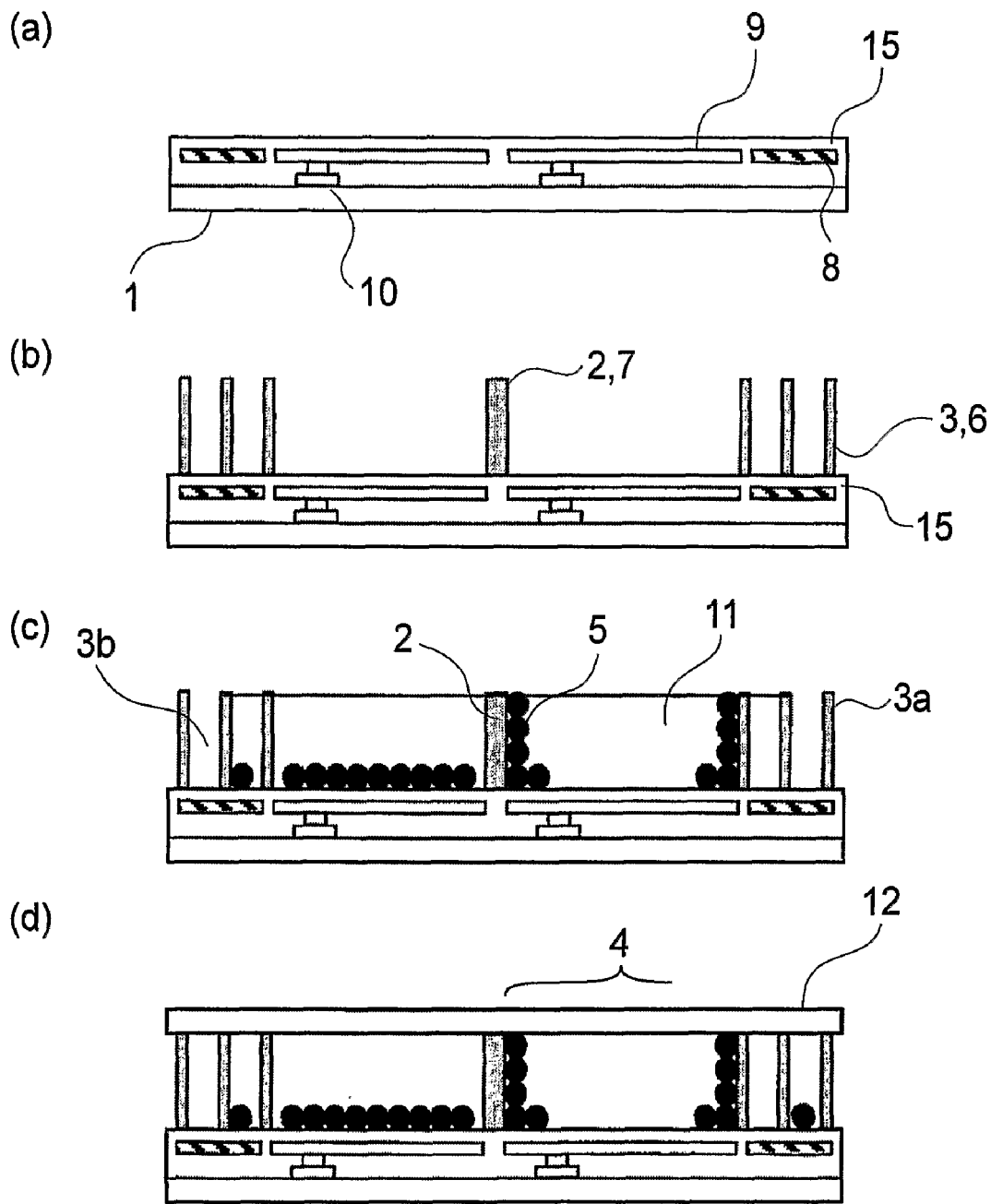
FIGS. 6(a) to 6(d) are sectional views for illustrating an embodiment of a process for producing the particle movement-type display apparatus of the present invention.
Figure 7:
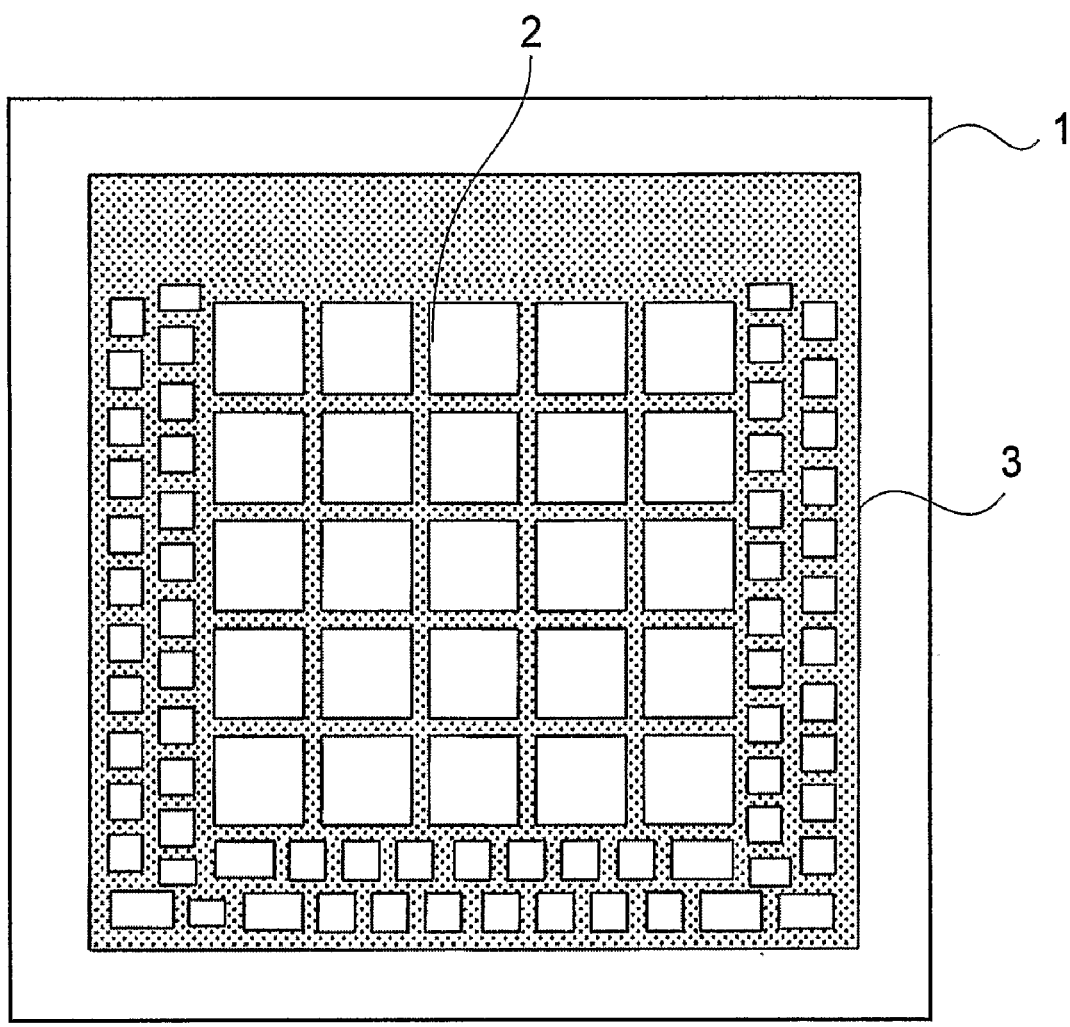

As a shape of the projection portion 3a of the structure 3 in the present invention when viewed from the above, other than the mesh shape, it is possible to use a straight line shape as shown in FIG. 3 such that line-shaped projection portions 3a are extended from the inside to the outside and in parallel with each other so as to provide recess portions 3b between adjacent projection portions; a shape as shown in FIG. 4 such that the display portion is surrounded multiply (double in FIG. 4) by rectangular projection portions 3a with a recess portion 3b therebetween; a dot shape as shown in FIG. 5 such that the display portion is substantially surrounded by a large number of dots at the substantially same distribution density with recess portions 3b therebetween; a curved-line shape such as wavy shape; a double cross shape; a cross shape; a combination of these shapes; etc. However, the shape of the projection portion 3a is not limited thereto. Further, the meshes, the lines, the dots, and the like may have a substantially uniform pitch but may preferably have such a pitch that it is decreased from the display portion area toward the outer portion so as to increase the strength of the outer portion by increasing a proportion of the projection portion 3a of the structure 3 viewed from the above may be regular or irregular and the pattern shape may be closed in an in-plane direction as in the cases of the mesh shape shown in FIG. 2 and the surrounding shape shown in FIG. 4 or open in the in-plane direction as the cases of the straight line shape shown in FIG. 3 and the dot shape shown in FIG. 5. In the case of the closed projection portion 3a, when the sealing is performed by covering the display portion with the second substrate 12, the display portion is sealed multiply in the in-plane direction of the substrate, thus being excellent in airtightness. In the case of the opened projection portion 3a, even when the insulating liquid 11 and the electrophoretic particles 5 flow into the recess portion 3b of the structure 3, a remaining amount at the recess portion 3b is finally reduced. Further, the structure 3 does not need to be formed at the entire periphery of the display portion area as shown in FIG. 7. The projection portion described above may be a honeycomb shape which is advantageous in terms of a strength of the resultant display apparatus.

In the structure 3, an electrode layer 6 for structure 3 may preferably be formed at a surface or the inside of the projection portion 3a, between the substrate and the projection portion 3a, in the neighbourhood of the projection portion 3a (i.e., within the recess portion 3b of the structure 3), etc. The electrode layer 6 for structure 3 may be connected with a common electrode 7 described later. Further, at a portion, on the substrate 1, surrounded by the projection portion 3a of the structure 3, i.e., the recess portion 3b of the structure 3, a non-display area electrode 8 located outside the display area is formed. These electrodes 6 and 8 are used in a production step of the display apparatus as described later.

At each portion 4 in the display area, a pixel electrode 9 and the common electrode 7 are disposed. For example, in the case of a display apparatus for effecting display by moving the electrophoretic particles 5 in a direction substantially in parallel with the in-plane direction of the substrate, the pixel electrode 9 is disposed on the first substrate 1 at each pixel 4. In this case, the pixel electrode 9 also functions as a light-reflection layer. For this purpose, it is preferable that a scattering layer is disposed on an observer side of the reflection layer or the reflection layer is provided with a surface unevenness to cause irregular reflection. The pixel electrode 9 is connected with a switching element 10, such as a thin film transistor (TFT), formed on the first substrate 1. The common electrode 7 is formed so as to cover the neighbourhood or the surface of the partition wall 3. By these pixel electrode 9 and common electrode 7, the plurality of electrophoretic particles 5 dispersed in the insulating liquid 11 confined in each pixel 4 are controlled and moved.

The display is effected by applying a voltage between the pixel electrode 9 and the common electrode 7 to move the electrophoretic particles 5 therebetween. As shown at a left portion 4 in FIG. 2(b), by disposing the electrophoretic particles 5 on the pixel electrode 9, it is possible to display the color of the particles. On the other hand, as shown at a right portion 4, the electrophoretic particles 5 are collected to the common electrode 7, whereby incident light is reflected by the surface of the pixel electrode 9 and scattered by the scattering layer.

In such an active matrix driving method using a plurality of pixel circuit each including the switching element 10, each pixel circuit is disposed at an intersection of an associated data line and an associated scanning line. It is also possible to control and move the electrophoretic particles by a simple matrix driving method. In the simple matrix driving method, a plurality of line-shaped first electrodes and a plurality of line-shaped second electrodes intersect with each other to form a plurality of pixels each at an intersection, and the electrophoretic particles are filled in each pixel to which an electric field is selectively applied to control and move the particles.

In order to effect white/black display by using the above described electrophoretic display apparatus, the electrophoretic particles 5 is colored black and is driven in a shutter manner. On the other hand, in order to effect color display, the electrophoretic particles or other members may appropriately be colored. For example, by using black electrophoretic particles 5 and forming a color filter layer on the surface of the pixel electrode 9, it becomes possible to effect color display.

(Production Process of Display Apparatus)

An embodiment of a representative production process of the particle movement-type display apparatus in this embodiment will be described with reference to FIGS. 6(a) to 6(d).

First of all, in a display area in the first substrate 1, the switching element 10 (e.g., TFT) and wiring (not shown) are formed and thereon, an insulating layer provided with an unevenness and a contact hole and the pixel electrode 9 is formed with respect to the switching element 10. At the same time, the non-display area electrode 8 is formed at the outer periphery of the display portion. THen, on the pixel electrode 9 and the non-display area electrode 8, an insulating layer 15 is formed (FIG. 6(a)).

Next, on the insulating layer 15, the partition wall 2 and the structure 3 are formed and at the surfaces of the partition wall 2 and the structure 3, the common electrode layer 7 and the electrode layer 6 for structure are formed, respectively, so that they are flush with each other. Then, the resultant surface is covered with an insulating layer (not shown) (FIG. 6(b)).

Thereafter, the insulating liquid 11 and the electrophoretic particles 5 are uniformly filled in each pixel 4 in the display area (FIG. 6(c)). During the filling, an amount of the insulating liquid 11 is adjusted so that the insulating liquid 11 is adjusted so that the insulating liquid 11 flows over the partition wall 2 so as not to leave air in the pixel 4. The filling can be performed by means of a cylindrical nozzle, a slit nozzle, etc. The filling of the electrophoretic particles 5 using these nozzles is performed by close control, whereby the electrophoretic particles 5 are disposed substantially uniform in which pixel 4. However, at the peripheral portion of the filling area, the filling is liable to become nonuniform. This is because ejection of the insulating liquid 11 and the electrophoretic particles 5 from the nozzle is not stabilized so quickly. Accordingly, in order to stably perform uniform filling in the display area, it is necessary to ensure a stabilization area for filling the insulating liquid 11 and the electrophoretic particles 5 at the peripheral portion of the display area. The structure 3 can also function as the stabilization area.

Next, as shown in FIG. 6(d), each pixel 4 is sealed by the second substrate 12. At the time of performing the sealing with the second substrate 12, an AC voltage having an appropriate frequency is applied between the common electrode 7 and the electrode layer 6 for structure and between the pixel electrode 9 and the non-display area electrode 8, whereby it becomes possible to leave the filled electrophoretic particles 5 between the common electrode 7 and the pixel electrode 9. On the other hand, also at the peripheral portion of the display area, the insulating liquid 11 and the electrophoretic particles 5 are present. However, the peripheral portion has the above described shape, such as the mesh shape, the line shape, the dot shape, or the like, by the projection portion 3a of the structure 3, so that it is possible to hold the electrophoretic particles 5 at the recess portion 3b between the electrode layer 6 for structure and the non-display area electrode 8. As a result, it becomes possible to remove the electrophoretic particles 5 from a contact (bonding) interface between the second substrate 12 and the upper surfaces of the partition wall 2 and the projection portion 3a of the structure 3 without leaving the electrophoretic particles 5 at the contact interface, and it is possible to prevent an occurrence of sealing defect due to the presence of the electrophoretic particles at the contact interface. Further, by the presence of the structure 3, it is possible to ensure a sufficient adhesive (fixing) strength between the second substrate 12 and the first substrate 1. At the time of the sealing with the second substrate 12, when the second substrate 12 has a flexibility, in such a state that one end of the flexible second substrate 12 is bonded or fixed onto the first substrate 1, the other end of the flexible second substrate 12 is raised and closely pressed against the upper surfaces of the projection portion 3a (of the structure 3) and the partition wall 2 while pushing out an excessive insulating liquid 11, thus being bonded and fixed to the structure 3 or the first substrate 1 at the other end of the second substrate 12. When the second substrate 12 is a rigid member, the rigid second substrate 12 is closely disposed on the structure 3 and the partition wall 2 as it is and a peripheral and portion of the second substrate 12 is bonded and fixed to the first substrate 1. The thus prepared structure is connected with a voltage application circuit to provide a display apparatus.

Then, materials and other production process will be described.

As the first substrate 1 and the second substrate 12, it is possible to use: films of plastics, such as polyethylene terephthalate (PET), polycarbonate (PC), polyether sulfone (PES), etc.; glass; quartz; stainless steel; and the like. As the substrate or a support of the substrate to be disposed on the observer side, it is necessary to use a transparent material. However, in the case of an electrophoretic display apparatus of a reflection-type, the other substrate may be a colored film, such as PI film.

In the case where the common electrode 9 also functions as the reflection layer, it is preferable that the pixel electrode 9 is formed of a material having a high light-reflective property, such as silver, aluminum, etc. As a method of scattering incident light, as described above, it is possible to use the method wherein the pixel electrode 9 is provided with the surface unevenness for scattering.

As the insulating liquid 11, it is preferable that a nonpolar and transparent solvent, such as isoparaffin, silicone oil, xylene, toluene, or the like is used. It is also possible to use the electrophoretic particles 5 without employing the liquid.

As the electrophoretic particles 5, it is preferable that particles of a material having a good positive or negative chargeability in the insulating liquid are used. For example, it is possible to use particles of various inorganic or organic pigments, carbon black, and resins containing these pigments. The electrophoretic particles 5 may generally have a particle size of approximately 0.01-50 μm, preferably approximately 0.1-10 μm, more preferably approximately 0.5-5 μm.

Incidentally, in the insulating liquid 11 or the electrophoretic particles 5, it is also possible to add a charge control agent for controlling and stabilizing an electrical chargeability of the electrophoretic particles 5 and a dispersing agent for preventing agglomeration of the electrophoretic particles 5 and retaining a dispersion state.

The partition wall 2 and the structure 3 may be formed by any method, such as a method wherein a photosensitive resin layer is applied and then subjected to light exposure and wet development, a method wherein a partition wall 2 and a structure 3 which are prepared separately are bonded; printing method; etc.

In the above description, the particle movement-type display apparatus is explained with respect to the electrophoretic display apparatus but the present invention is also applicable to a so-called toner display for effecting display by driving only particles without using the liquid.

Incidentally, in FIGS. 2 to 7, the display apparatus principally includes the first substrate 1, the partition wall 2, the structure 3, the projection portion 3a of the structure 3, the recess portion 3b of the structure 3, the pixel 4, the electrophoretic particles 5, the electrode 6 for structure, the common electrode 7, the non-display area electrode 8, the pixel electrode 9, and the second substrate 12.

The particle movement-type display apparatus of the present invention embraces not only the electrophoretic display apparatus but also a display apparatus using no solvent.

Hereinbelow, the present invention will be described more specifically based on Examples.

EXAMPLE 1

In this example, an electrophoretic display apparatus has a structure shown in FIGS. 2(a) and 2(b).

The electrophoretic display apparatus is prepared in the following manner.

A first substrate 1 provided with TFTs, wiring, and the like is prepared. On the first substrate 1, an insulating layer is formed so as to provide a contact hole with respect to an associated TFT 10. At a portion for forming a pixel electrode 9, an unevenness is formed of a resist and thereon the pixel electrode 9 is formed in a film of aluminum, followed by patterning through photolithography. At the same time, a non-display area electrode 8 is formed at a peripheral portion of a display area. Then, on the pixel electrode 9 and the non-display area electrode 8, a transparent insulating layer 15 is formed.

Thereafter, at a boundary portion of each portion 4 formed in the display area, a partition wall 2 is formed in a width of 5 μm and a height of 15 μm. At the same time, at a periphery of the display area, a mesh-shaped structure 3 is formed in a width which is 20 times the size of pixel 4. In this case, the structure 3 has a projection portion 3a having the same width and height as the partition wall 2. The width of the projection portion 3a is sufficiently smaller than a width which is approximately 10 times a diameter of the electrophoretic particles 5. The structure 3 has a mesh pitch of ½ of a pitch of partition wall 2 in a pixel area. Thereafter, a metal layer is formed and patterned on the surfaces of the partition wall 2 and the structure 3 to form a common electrode 7 and an electrode 6 for structure. On the surfaces of these electrodes 7 and 6, in insulating layer is formed.

Next, the pixel electrode 9 and the non-display area electrode 8 are caused to have the same potential and between these electrodes 9 and 8 and between the electrodes 7 and 6, a voltage of ±10 V is applied at a frequency of 500 Hz. In the voltage application state, an insulating liquid 11 and electrophoretic particles 5 are filled in each pixel 4 by using nozzles. As a result, the electrophoretic particles 5 are not present on the upper surfaces of the partition wall 2 and the structure 3 by the AC voltage application and are collected between adjacent partition wall portions, between adjacent projection portions 3a, or between the partition wall and the projection portion 3a. In this state, each pixel 4 is sealed with a second substrate 12. The resultant display device is connected with a voltage application circuit to provide a display apparatus.

The resultant display apparatus can suppress sealing defect occurring due to the presence of the electrophoretic particles 5 sandwiched between the second substrate 12 and the partition wall 2 and between the second substrate 12 and the projection portion 3a of the structure 3, while ensuring a strength.

EXAMPLE 2

In this example, similarly as in Example 1, on first substrate 1, TFTs, wiring and the like, an insulating layer, a pixel electrode 9, and a non-display area electrode 8 are formed.

Thereafter, at a boundary portion of each portion 4 formed in the display area, a partition wall 2 is formed in a width of 5 µm and a height of 15 µm. At the same time, at a periphery of the display area, a line-shaped structure 3 is (FIGS. 2 and 3). In this case, the structure 3 has a projection portion 3a having the same width and height as the partition wall 2. Thereafter, a metal layer is formed and patterned on the surfaces of the partition wall 2 and projection portion 3a of the structure 3 to form a common electrode 7 and a non-display area electrode 8. On the surfaces of these electrodes 7 and 8, in insulating layer is formed.

Next, the pixel electrode 9 and the non-display area electrode 8 are caused to have the same potential and between these electrodes 9 and 8 and between the electrodes 7 and 8, a voltage of ±15 V is applied at a frequency of 500 Hz. In the voltage application state, an insulating liquid 11 and electrophoretic particles 5 are filled in each pixel 4 by using cylindrical nozzles. As a result, the electrophoretic particles 5 are not present on the upper surfaces of the partition wall 2 and the structure 3 by the AC voltage application and are collected between adjacent partition wall portions, between adjacent projection portions 3a, or between the partition wall and the projection portion 3a. In this state, each pixel 4 is sealed with a second substrate 12. The resultant display device is connected with a voltage application circuit to provide a display apparatus.

The resultant display apparatus can suppress sealing defect occurring due to the presence of the electrophoretic particles 5 sandwiched between the second substrate 12 and the partition wall 2 and between the second substrate 12 and the projection portion 3a of the structure 3, while ensuring a strength.

INDUSTRIAL APPLICABILITY

The display apparatus of the present invention can be used in various electronic equipment, such as a mobile-type personal computer (information processor). The personal computer is constituted by a main assembly portion, provided with a keyboard, and the above described display apparatus. The display apparatus is also applicable to a display portion of cellular phone which is provided with a plurality of operating buttons, a receiving portion, a transiting portion (mouthpiece), and the above described display apparatus. Further, the display apparatus is applicable to a finder for a digital still camera which is provided with a light-receiving unit including an optical lens, CCD, etc., on the observer side. In the digital still camera, a light image of a subject is photoelectric-converted into an imaging signal by an image pickup device, such as the CCD. At a back surface of a casing of the digital still camera, the above described display apparatus for effecting display on the basis of the imaging signal by the CCD is disposed and functions as the finder. The display apparatus of the present invention is further applicable to electronic book, electronic paper, a liquid crystal television, a carnavigation apparatus, electronic notepad, equipment provided with a touch panel, and so on.

While the invention has been described with reference to the structures disclosed herein, it is not confined to the details set forth and this application is intended to cover such modifications or changes as may come within the purpose of the improvements or the scope of the following claims.

The invention claimed is:

1. A particle movement-type display apparatus, comprising:
 a substrate;
 a plurality of pixels;
 a partition wall disposed on the substrate for partitioning the plurality of pixels; and
 particles disposed at the plurality of the pixels;
 wherein the plurality of pixels and the partition wall constitute a display portion around which a peripheral area is disposed,
 wherein the peripheral area includes a projection portion, and
 wherein the projection portion or the partition wall is provided with a recess portion at a surface thereof opposite from a surface thereof facing the substrate.

2. An apparatus according to claim 1, wherein the recess portion has a depth which is not less than a diameter of the particles.

3. A particle movement-type display apparatus, comprising:
 a substrate;
 a plurality of pixels;
 a partition wall disposed on the substrate for partitioning the plurality of pixels; and
 particles disposed at the plurality of pixels,
 wherein the plurality of pixels and the partition wall constitute a display portion around which a peripheral area is disposed,
 wherein in the peripheral area, a plurality of projection portions each having a height substantially equal to a height of the partition wall is provided, and
 wherein each of the projection portions is separated by a spacing area.

4. An apparatus according to claim 3, wherein the projection portion has a mesh shape, a linear or curved line shape, a dot shape, a shape closely surrounding the display portion, a double cross shape, a cross shape, a honeycomb shape, or a combination of these shapes.

5. An apparatus according to claim 3, wherein the projection portion has a line width, which is not more than ten times a diameter of the particles, at an upper surface thereof.

* * * * *